United States Patent [19]

Crowe

[11] 4,169,555
[45] Oct. 2, 1979

[54] EXTENDIBLE EXIT CONE

[75] Inventor: Gearld E. Crowe, Santa Clara, Calif.

[73] Assignee: United Technologies Corporation, East Hartford, Conn.

[21] Appl. No.: 818,906

[22] Filed: Jul. 25, 1977

[51] Int. Cl.² .............................................. B64D 33/04
[52] U.S. Cl. ........................ 239/265.33; 285/DIG. 22
[58] Field of Search ..................... 239/265.11, 265.19, 239/265.33, 265.35, 265.37, 265.39, 265.41, 265.43; 285/DIG. 22, 319

[56] References Cited

U.S. PATENT DOCUMENTS

| 115,917 | 6/1871 | Wharton | 285/DIG. 22 |
| 1,479,553 | 1/1924 | Parlow | 285/319 X |
| 2,408,099 | 9/1946 | Sherman | 239/265.19 |
| 3,561,679 | 2/1971 | Lager | 239/265.11 |
| 3,672,162 | 6/1972 | Rygelis et al. | 285/DIG. 22 |
| 3,837,577 | 9/1974 | Presz, Jr. | 239/265.33 |
| 4,030,850 | 6/1977 | Hyde | 285/DIG. 22 |

Primary Examiner—Robert W. Saifer
Attorney, Agent, or Firm—Steven F. Stone

[57] ABSTRACT

Extendible exit cones for reaction motor nozzles of the telescoping or "Boy Scout cup" type are provided whereby positive locking means are used to maintain the exit cones in their extended positions against the aerodynamic and internal pressure forces experienced by the nozzle.

8 Claims, 4 Drawing Figures

EXTENDIBLE EXIT CONE

BACKGROUND OF THE INVENTION

In many rocket motor applications it is necessary to obtain the efficiencies associated with the optimum nozzle expansion ratio but the extra length of the nozzle exit cone that is required to reach this optimum expansion ratio cannot be tolerated in a specific missile envelope. In these cases it has been known to utilize extendible exit cones of various types. One type which has been proposed is the telescoping or "Boy Scout cup" extendible exit cone such as is shown in U.S. Pat. No. 3,561,679, Lager, Feb. 9, 1971 for Collapsible Nozzle for Aircraft Rocket Motors. In this approach, two or more exit cone segments are telescoped over each other in the stowed position and then extended rearwardly to the fully deployed position and locked in place by suitable locking fingers, all is shown in the aforementioned U.S. Patent. When an extendible exit cone such as that shown in the Lager patent was tested it was determined to be unsatisfactory for several reasons; the most important of which was that the blow-off forces generated within the extendible exit cone tended to force the lips of the locking fingers on the aft nozzle exit cone section out of engagement with the locking shoulder on the forward exit cone segment. This produced leakage of high temperature gases around the surfaces causing damage thereto and also tended to permit the exit cone to collapse upon the action of the blow-off forces. According to this invention I have provided a positive locking means for maintaining the extendible exit cone segments in their extended position which is not susceptible to unlatching under the action of blow-off forces nor is it susceptible to gas leakage.

It is accordingly an object of this invention to provide a locking means for locking the nozzle extension cones in their deployed position. This and other objects of the invention will be readily apparent from the following description with reference to the accompanying drawings wherein FIG. 1 is a side view, partly broken away, of an extendible nozzle exit cone according to this invention.

DESCRIPTION OF THE INVENTION

Figure 1:
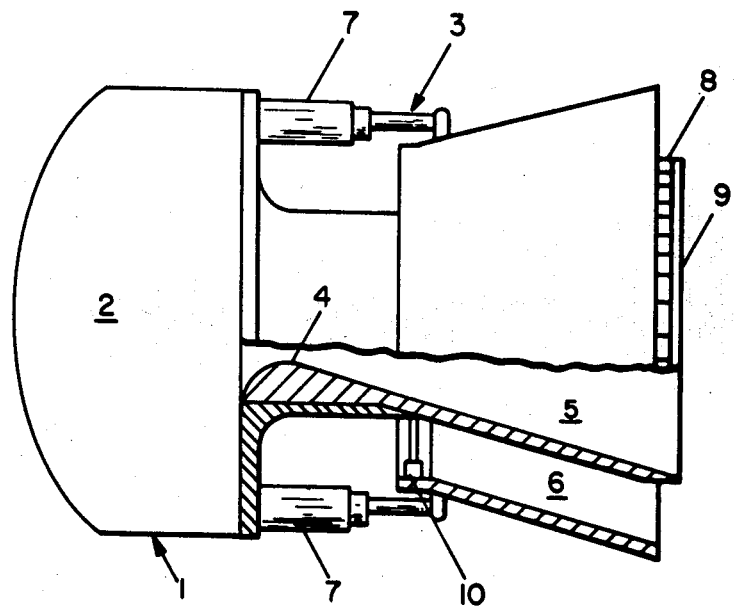

Referring now to FIG. 1, a rocket motor 1 is provided having a combustion chamber defining portion 2 affixed to which is a nozzle portion 3 which comprises the nozzle throat portion 4, exit cone portion 5 and an extendible exit cone portion 6, it being recognized that additional exit cone segments can be provided if required. Suitable actuator means 7 are also provided to move the extendible portion of the exit cone from its stowed to its extended position, all as is known to the art. The outer end of the exit cone portion 5 is provided with a plurality of circumferentially spaced outwardly biased retaining fingers 8 which are mounted about the periphery of the exit cone portion 5 and spaced from the end thereof by sealing rim 9, the detailed structure of which will be described with respect to FIGS. 2a, 2b and 2c. Similarly, the inward end of extendible exit cone portion 6 is provided with locking step 10.

Figure 2A:
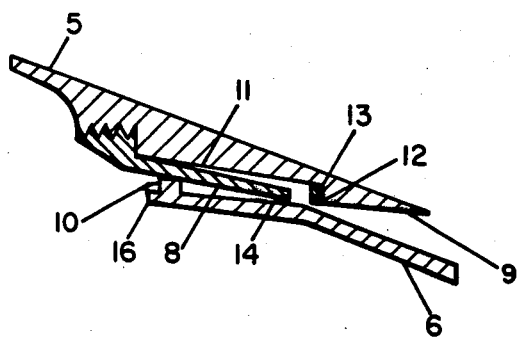
FIG. 2a is a detailed view of the locking mechanism according to this invention in the stowed position.

Referring now to FIG. 2a, a detailed view of the locking mechanisms is provided. The exit cone portion 5 has affixed thereon a plurality of spring-like, outwardly biased, retaining fingers 8 which are mounted on and extend over a substantially constant external diameter locking ramp 11 which is formed in and extends substantially around the exit cone portion 5. Ramp 11 terminates at its rearward end at locking shoulder 12 formed adjacent to the substantially constant external diameter sealing rim 9 formed on the outer end of exit cone portion 5. Locking shoulder 12 is preferably provided with an elastomeric or soft metal seal 13.

Figure 2B:
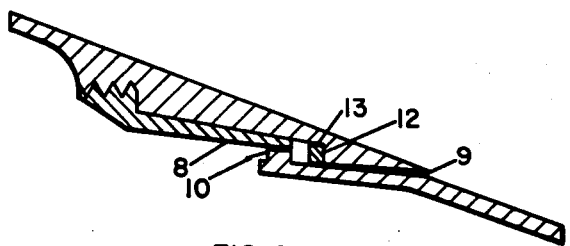
FIG. 2b is a detailed view of the locking mechanism according to this invention in the partially deployed position.
Figure 2C:
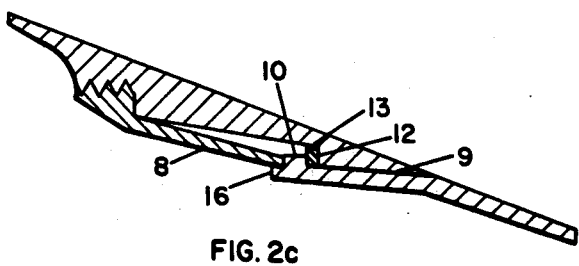
FIG. 2c is a detailed view of the locking mechanism according to this invention in the fully deployed position.

The forward end of the extendible exit cone portion 6 is similarly provided with a substantially constant internal diameter sealing rim portion 14 which is sized for sliding engagement with sealing rim 9 and which is provided with locking step 10 adjacent to the forward end of rim 14 and spaced from said end by locking lip 16. As can be seen from FIG. 2a, in the stowed position the extendible exit cone portion 6 is telescoped about exit cone 5 and locking step 10 is in sliding contact with retaining fingers 8 which are biased away from locking ramp 11. As the extendible exit cone 6 is deployed as shown in FIG. 2b it moves to the rear with locking step 10 forcing retaining fingers 8 towards ramp 11. As the extendible exit cone 6 reaches its fully deployed position, retaining fingers 8 return to their original position biased away from ramp 11 and engage locking step 15 to firmly maintain the locking step against locking shoulder 12 and seal 13. Further outward motion of fingers 8 is prevented by locking lip 16 which positively resists any tendency to disengage the extendible exit cone 6 as a result of the forces exerted on the exit cone. A gas resistant seal is also provided between the constant diameter sealing rim portion 14 on the extendible cone 6 and the constant diameter sealing rim 9 on the exit cone 5 and also between the rear face of locking step 15 and locking shoulder 12 and sealing means 13. In addition when the sealing means 13 is formed of the elastomeric material it acts as both a joint seal and a deployment load shock absorber.

The joint itself formed between the exit cones is self-aligning in that a relatively high degree of extendible cone cant or misalignment during deployment can be tolerated since the long, constant diameter ramp approach to the joint provided by the locking fingers 8 will align the cones for proper fastening. Further, the joint itself will tend to seal itself during motor firing because the elastomeric washer can be made from a material such as silicone rubber which expands when exposed to high temperatures thereby effectively tightening the joint. Also, during firing the aft end of exit cone 5 will heat up more rapidly than the adjacent forward section of the extendible exit cone 6 which is not directly exposed to the combustion gases and the resulting differential thermal expansion will tend to tighten the joint and improve the seal. Deployment system checkout is also readily facilitated by the ease with which the deployed cones can be disassembled. A simple circular bond clamping tool can be applied around fingers 8 to force them against the locking ramp 11 thereby disengaging locking step 10 permitting the aft section to be slid into its stowed position.

The exit cones and the locking mechanism can be fabricated from any of a wide variety of materials used in the art for similar purposes. A preferred embodiment forms the cones and the locking mechanism, including the fingers, from carbon-carbon composites in which a graphitized carbon matrix is reinforced with graphitized carbon fibers. In this embodiment the self-lubricating properties of the material assists in operation.

Having thus described my invention it will be readily apparent that various modifications can be made by workers skilled in the art without departing from the scope of this invention which is limited only by the following claims wherein:

I claim:

1. A telescoping extendible nozzle exit cone assembly comprising, in combination, an inner exit cone and at least one outer exit cone, said outer cone being mounted around said inner cone and movable with respect thereto from a first stowed position to a second deployed position and locking means for locking said outer exit cone to said inner exit cone in the deployed position, said locking means comprising:
   (a) a substantially constant external diameter locking ramp formed about the periphery of said inner core, said ramp terminating at its rearward end in an outwardly directed locking shoulder;
   (b) a plurality of retaining fingers mounted about said inner cone, overlying said locking ramp portion and being biased away therefrom, said retaining fingers terminating a predetermined distance from said locking shoulder; and
   (c) a substantially constant internal diameter rim portion formed on the forward portion of said outer cone, said rim portion, at its forward end, terminating in an inwardly directed locking step sized to be received in locking relationship between the end of said retaining fingers and said locking shoulder.

2. The assembly of claim 1 wherein said locking shoulder is provided with elastomeric sealing means in engagement with said locking step.

3. The assembly of claim 2 wherein said locking shoulder is formed forward of a substantially constant external diameter sealing rim portion at the rearward end of said inner exit cone said external diameter being sized to be received in sliding sealing relationship to said rim portion on said exit cone.

4. The assembly of claim 3 wherein a locking lip is formed between said locking step and the forward end of said outer cone, said lip, in the deployed position, preventing outward motion of said locking fingers.

5. The assembly of claim 2 wherein a locking lip is formed between said locking step and the forward end of said outer cone, said lip, in the deployed position, preventing outward motion of said locking fingers.

6. The assembly of claim 1 wherein said locking shoulder is formed forward of a substantially constant external diameter sealing rim portion at the rearward end of said inner exit cone, said external diameter being sized to be received in sliding sealing relationship to said rim portion on said outer exit cone.

7. The assembly of claim 6 wherein a locking lip is formed between said locking step and the forward end of said outer cone, said lip, in the deployed position, preventing outward motion of said locking fingers.

8. The assembly of claim 1 wherein a locking lip is formed between said locking step and the forward end of said outer cone, said lip, in the deployed position, preventing outward motion of said locking fingers.

* * * * *